Figures 1, 2:
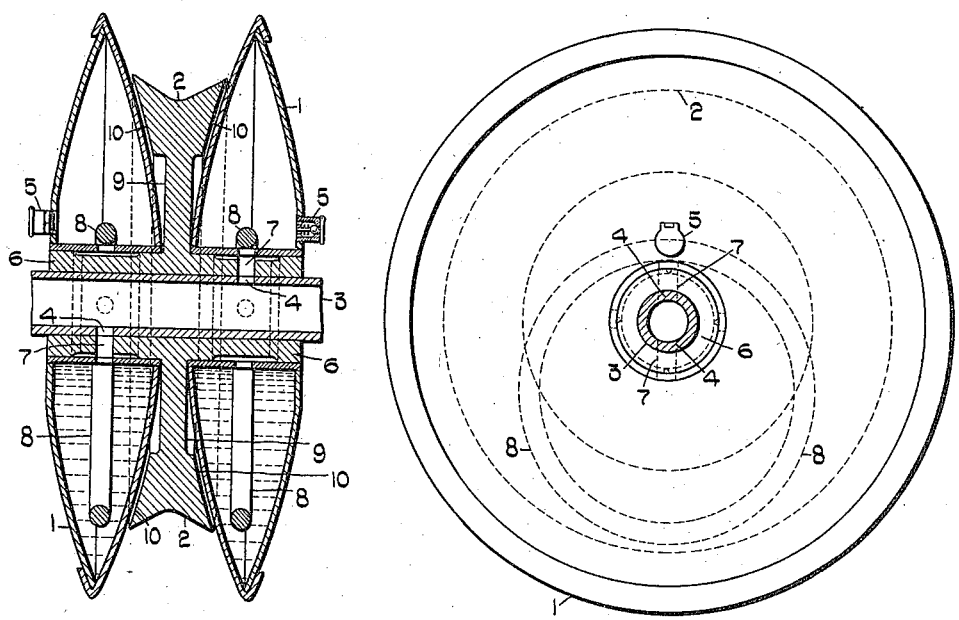

J. W. ANDERSON.
TROLLEY WHEEL.
APPLICATION FILED JULY 11, 1912.

1,060,055.

Patented Apr. 29, 1913.

Witnesses:
Gertie Nicholson
Geo. W. Morgan

Inventor:
John W. Anderson
by
Alfred J. Bratton
attorney

UNITED STATES PATENT OFFICE.

JOHN WILLIAM ANDERSON, OF HAMILTON, ONTARIO, CANADA, ASSIGNOR OF ONE-HALF TO ALLITH MANUFACTURING COMPANY, LIMITED, OF HAMILTON, CANADA.

TROLLEY-WHEEL.

1,060,055.  Specification of Letters Patent.  Patented Apr. 29, 1913.

Application filed July 11, 1912. Serial No. 708,903.

*To all whom it may concern:*

Be it known that I, JOHN WILLIAM ANDERSON, a citizen of the Dominion of Canada, residing at 222 King street west, in the city of Hamilton, in the county of Wentworth, in the Province of Ontario, Dominion of Canada, have invented certain new and useful Improvements in Trolley-Wheels, of which the following is a specification.

My invention relates to trolley-wheels for electric railroads of the class formed of several sections, which may be readily disengaged one from the other to permit of the insertion of the tread, which tread wears away very rapidly and thereby renders the wheel useless in a short time.

One object of my invention is to furnish a trolley-wheel of the above referred to class which is provided with oiling means arranged for the continuous circulation of oil to the bearings as well as to prevent dripping.

A still further object of my invention is to so construct the trolley wheel that it may be readily separated into halves to permit the easy removal and replacement of the tread when worn out.

With the above and other objects in view, my invention consists in the novel construction, combination, and arrangement of parts hereinafter more fully described, and specifically pointed out in the appended claim.

In describing my invention in detail, reference is had to the accompanying sheet of drawings, forming a part of this specification, and wherein like numerals of reference designate like parts throughout the description.

Figure 1, is an axial longitudinal section through a trolley-wheel for electric railroads incorporating my present improvements. Fig. 2, is a side elevation of the same.

According to the form of my invention illustrated, the trolley-wheel briefly comprises side sections, 1, 1, a removable tread or trolley-wheel proper 2, and a hollow axle 3, for fitment to the fork of the trolley head. The hollow axle 3, is furnished with orifices 4, 4, and each side section 1, consists of a dished or hollow sheet steel built up receptacle adapted to contain a supply of oil conveniently fed thereinto through oil-valves 5, 5. These side sections are freely revoluble on the hub extensions 6, 6, of the trolley wheel proper 2, and said hub extensions are pierced with radial holes 7, 7.

8, 8, are oil rings located in the side sections 1, 1, for the purpose of lifting the oil constantly to the respective bearings.

The trolley wheel proper is preferably formed with a solid web portion 9, and the tread thereof is shaped on its peripheral faces, 10, 10, to fit snugly to the contour of the side sections 1, 1. Grooves are cut in the surface of the hub extensions 6, 6, to insure a proper flow of the lubricating oil.

From the foregoing description it will be seen that by my invention I provide a very effective and simple trolley-wheel furnished with perfect lubrication.

Having fully described my invention, what I claim as new, and desire to secure by Letters Patent, is:

A trolley wheel of the character described, comprising in combination, a central body member having a flaring grooved tread portion, a tubular bearing portion and a reduced central web extending between said tread portion, and said bearing portion, said bearing portion being provided with a pair of separate peripheral oil grooves one upon each side of said web, hollow lubricant reservoirs disposed upon the opposite sides of said web and revolubly mounted upon said tubular body portion, each of said reservoirs comprising inner and outer walls having their peripheral edges interengaged, and a bearing portion which embraces that portion of the bearing portion in which the peripheral oil groove is formed and the inner walls of said lubricant reservoirs being bowed and extending inwardly beneath the tread portion and lying in contact with the web at the juncture of said web with said bearing portion, said lubricant reservoirs extending beyond the tread portion and lying close thereto and forming trolley wire retaining and guiding elements which lie at an abrupt angle to the adjacent wire engaging faces of the tread portion.

In testimony whereof I have hereunto affixed my signature, in the presence of two subscribing witnesses, at Hamilton, Ontario, Canada, this 24th day of June, A. D. 1912.

JOHN WILLIAM ANDERSON.

Witnesses:
ALMA GUEST,
GERTIE NICHOLSON.